United States Patent Office 3,770,841
Patented Nov. 6, 1973

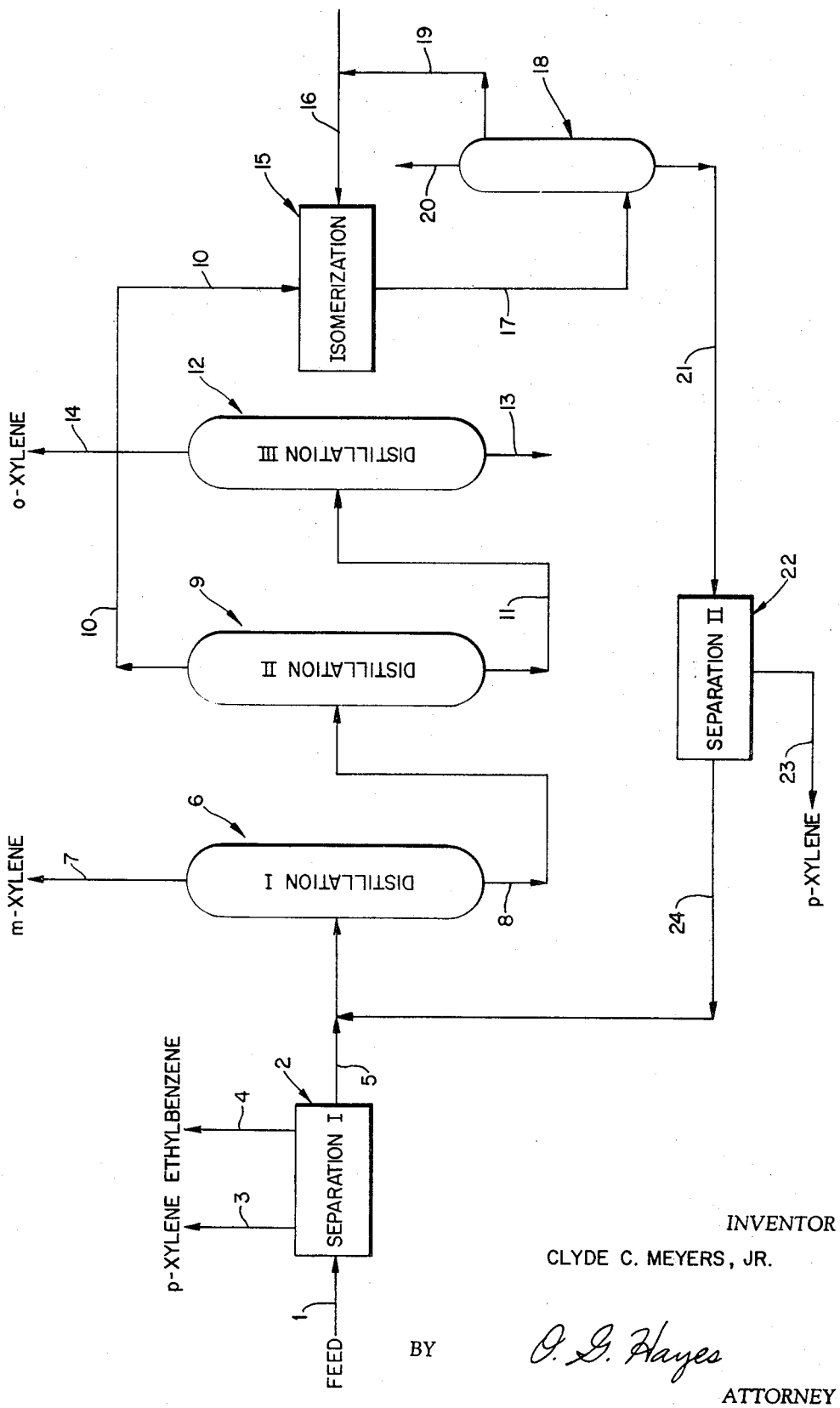

3,770,841
SEPARATION OF AROMATIC MIXTURES
Clyde C. Meyers, Jr., Beaumont, Tex., assignor to
Mobil Oil Corporation
Filed June 25, 1971, Ser. No. 156,757
Int. Cl. C07c 5/24
U.S. Cl. 260—668 A                                    23 Claims

ABSTRACT OF THE DISCLOSURE

A process for the separation and manufacture of components from a $C_8^+$ aromatics mixture, including para-xylene, meta-xylene and ortho-xylene by subjecting the mixture to a chromatographic separation to remove any ethylbenzene and most or all of the para-xylene, distilling the resultant mixture in a first distillation station to remove a portion of the meta-xylene; distilling the residue in a second distillation station to remove the remainder of the meta-xylene and some of the ortho-xylene and passing this distillate to an isomerization station, removing the residue to a third distillation station and distilling the ortho-xylene therefrom; isomerizing said distillate from the second distillation station for para-xylene formation, chromatographically separating the mixture from the isomerization to remove para-xylene and recycling the remaining mixture to the first distillation stage. The process can be practiced with (1) omission of ortho-xylene production by by-passing the third distillation station, (2) omission of meta-xylene production by by-passing the first distillation station, or (3) omission of both ortho- and meta-xylene production by-passing the first and third distillation stations.

BACKGROUND OF THE INVENTION

Field of the invention

This invention relates to a method for the separation of valuable components from a mixture of aromatic compounds and, in particular, to a combined process including chromatography or adsorption, one or more distillation stages, isomerization and a second chromatographic separation to provide high purity para-xylene and other components of the mixture.

DESCRIPTION OF THE PRIOR ART

The xylenes and especially para-xylene are very useful materials but are generally found only in admixture with each other. Thus, the xylenes are found in substantial quantities in coke oven light oil and certain virgin and reformed petroleum naphthas. Accordingly, it is necessary to utilize a separation procedure to recover the desired components. Heretofore, it has been the practice in separating xylene isomers either to use chemical methods or to distill para- and meta-xylene, ethylbenzene and some paraffins from a fraction containing the xylene isomers, ethylbenzene and paraffins and thus separate ortho-xylene as a distillation bottoms product in admixture with some of the paraffins. Para-xylene is then separated from the distillate by fractional crystallization. Various methods have been devised utilizing one or more of the steps of crystallization, distillation and adsorption in particular but, in general, none of these prior processes has been able to provide a procedure for the substantially complete isolation of all the components in high purity. While a number of the processes are suitable to provide the para-xylene component in good recovery they have not been able to provide the remaining valuable components, meta-xylene and ortho-xylene free from ethylbenzene. It is, of course, well known that para-xylene is valuable intermediate for the preparation of terephthalic acid.

The process of the present invention is considered to overcome the disadvantages of the prior art and to provide a unique continuous procedure for separation of the valuable components contained in aromatic mixtures into high purity fractions.

SUMMARY OF THE INVENTION

It is, accordingly, one object of the present invention to provide a process for the separation of xylene isomers which overcomes or otherwise mitigates the problems of the prior art.

A further object of the invention is to provide a procedure for the separation and recovery of high purity para-xylene from a $C_8^+$ aromatic stream utilizing a combination of unique steps.

A still further object of the invention is to provide a continuous process for the separation and recovery of para-xylene, ortho-xylene, and meta-xylene from an aromatic mixture containing the same utilizing chromatography or adsorption steps in combination with distillation and isomerization steps.

Other objects and advantages of the present invention will become apparent as the description thereof proceeds.

In satisfaction of the foregoing objects and advantages there is provided by this invention a process for the separation and recovery of xylene isomers from an aromatic mixture containing the same which comprises (1) subjecting the mixture initially to a chromatography or adsorption step to remove the para-xylene and ethylbenzene and provide a fraction containing the remaining components of the mixture which is passed to multiple distillation stages for removal of (a) meta-xylene if desired, (b) ortho-xylene if desired, or both, passing the remainder of the mixture, after removal from heavy ends, to an isomerization stage to form additional para-xylene, which isomerized mixture is then subjected to chromatography or adsorption for the removal of the para-xylene formed in the isomerization steps. The bottoms from the latter step are then recycled to the first distillation column for recovery of meta-xylene and/or ortho-xylene which may subsequently be recycled through the system as described or recovered.

BRIEF DESCRIPTION OF THE DRAWING

Reference is now made to the drawing accompanying this application in which there is illustrated a schematic diagram of a process for practicing the invention.

DESCRIPTION OF THE PREFERRED EMBODIMENTS

The process of the present invention is concerned with a procedure for the treatment of a $C_8$ aromatic mixture which contains para-xylene, ethylbenzene, meta-xylene and ortho-xylene for the recovery of the valuable components therefrom. This process is especially desirable where ethylbenzene is not a preferred product. Generally, such a mixture, as obtained from most sources, will contain these components in the following concentrations:

| Component: | Amount, weight percent |
|---|---|
| Para-xylene | 15–40 |
| Ethylbenzene | 0–15 |
| Ortho-xylene | 0–25 |
| Meta-xylene | 40–60 |

This mixture will also generally contain other $C_8$ and $C_9$ and higher paraffinic materials, mostly aromatic in nature, which must be separated from the above components and the above components must be separated from each other in an optimum process of this type.

According to the process of the present invention, two chromatography or adsorption steps are combined with distillation and isomerization steps to provide a unique method for the recovery and isolation of the desired $C_8$ aromatics from a typical $C_8^+$ aromatic feedstock. Thus, in one embodiment, chromatography or adsorption is initially employed to remove the para-xylene and ethylbenzene from the feed streams and provide a mixture containing primarily the meta-xylene and ortho-xylene and $C_9^+$ aromatics. This initial separation is generally a chromatographic one conducted in the presence of an adsorber, preferably a crystalline aluminosilicate zeolite which will adsorb the para-xylene and ethylbenzene but not the other components. After the initial separation stage, the remaining mixture, which contains primarily meta-xylene and ortho-xylene with some $C_9$ and higher components and perhaps some para-xylene can be treated by optional distillation procedures to recover the meta-xylene, ortho-xylene or both.

In the preferred method, three distinct distillation stages are utilized so as to provide good recoveries of the meta-xylene and ortho-xylene. In the first stage the mixture is subjected to distillation in a fractionation column to remove a portion of the meta-xylene. Thereafter, the non-distilled portion or residue is distilled in a second distillation stage to remove the remainder of the meta-xylene and a portion of the ortho-xylene, as a mixture, which mixture is removed to the isomerization stage. The remaining residue from the second distillation stage is then fractionally distilled in a third distillation stage to recover the ortho-xylene and leave a heavy end residue of $C_9$ and higher aromatics.

If, in operating the process, it is preferred not to recover meta-xylene, as would be the case when little or no meta-xylene is contained in the feed stream, the first or initial distillation stage is omitted. If no ortho-xylene is present in the feed or if it is desired not to recover ortho-xylene, then the third distillation stage is omitted. If it is preferred not to recover either the meta- or ortho-xylene, both of these distillation stages are omitted and the mixture merely distilled away from the heavy ends, primarily $C_9$ and higher aromatics, and sent to the isomerization step.

In the next step, the mixture is subjected to isomerization to convert at least a portion to para-xylene, the preferred product. The isomerization step may be conducted in any desired manner for conducting such isomerizations as known in the art, but is preferably conducted under relatively low temperatures with toluene dilution, called LTI herein, and described more in detail hereinafter. The isomerized mixture is then removed to the second separation stage for additional para-xylene recovery. The second separation stage may be conducted under the same conditions and in the same manner as the first stage or different procedures may be used. For example, one separation may be conducted at low temperatures in the liquid phase while the other is a high temperature vapor phase operation. Thus, both separations are conducted in a chromatographic manner over a crystalline aluminosilicate zeolite adsorbent which will adsorb the para-xylene and not the other components either in the vapor or liquid phase. The para-xylene may then be recovered by desorption with a gas or liquid. The other components or those only partially or not desorbed, are then recycled to the distillation stage for processing through the system and recovery of other valuable components.

Referring now to the drawing accompanying the application in detail, it will be seen that the fresh feed comprising the $C_8$ aromatic mixture is fed by line 1 into the chromatgraph or adsorber 2. In chromatograph or adsorber 2, which may be constructed in any desired manner such as by forming a bed of the adsorbent, the $C_8$ aromatic mixture is passed thereover for effecting the desired separation. Thus, in this initial step of the invention, the aromatic mixture is subjected to an adsorption step from which there is recovered by desorption para-xylene in line 3 and ethyl-benzene in line 4. A second mixture, comprising meta-xylene, ortho-xylene and the $C_9$ and higher paraffins, which is not adsorbed, is recovered in line 5. While any conventional adsorption procedure can be used, it is preferred to conduct the adsorption step in the presence of a molecular sieve or synthetic crystalline aluminosilicate zeolite as the adsorbent. Zeolites of the type which may be used in the adsorption step include any of the natural and synthetic zeolites which will effect the desired separation. However, it is preferred to use the zeolites identified as ZSM-5 and ZSM-8, described in copending application Ser. No. 882,692, filed Dec. 5, 1969, now U.S. Pat. No. 3,699,182 of John Cattanach and assigned to the same assignee. These zeolites are fully disclosed and described in the aforementioned copending application, the disclosure of which is hereby expressly incorporated by reference. These zeolites have the unique property of adsorbing para-xylene and ethylbenzene while the diffusion into the pore structure by other aromatics, such as ortho-xylene, meta-xylene and $C_9$ and higher aromatics, is significantly slower than the para-xylene and ethylbenzene. Thus, it can be stated that these other zeolites do not appreciably enter the zeolite pore structure. Conventional adsorption and desorption procedures may be used in this step.

In conducting the adsorption process the aromatic mixture is heated to the desired temperature (e.g. 50–500° F., preferably about 100–400° F.) and passed through a vessel containing the adsorbing material or over a porous bed of the same in a conventional manner. The adsorption may be conducted in either the liquid phase or gas phase. In the process, the para-xylene and ethyl-benzene, the only materials, adsorbed, may then be recovered from the adsorbent by any of several alternative procedures. Thus, heating the adsorbent, reducing the partial pressure of the sorbed material in the vapor surrounding the adsorbent, lowering the total pressure of the system or purging with a suitable inert gas such as steam, helium, nitrogen, etc. effect suitable desorption of the mixtures. As a result of these desorption techniques, the para-xylene and ethylbenzene are eluted in this order in the vapor operation and in reverse order in the liquid phase operation. The remainder of the mixture comprising meta-xylene, ortho-xylene and any $C_9$ and higher carbon aromatics and/or other components is taken off through line 5.

Referring back to the initial adsorption step, the unadsorbed mixture from this step contains the remainder of the mixture, that is primarily meta-xylene, ortho-xylene, perhaps a small amount of para-xylene and ethyl-benzene and any other $C_8$ or $C_9$ and higher paraffinic materials which may be present. This mixture is taken off at line 5 and passed into a distillation column 6 identified as distillation stage I. This distillation zone, which may be operated at atmospheric pressure or under vacuum is carried out under such conditions as to remove meta-xylene through line 7 under fractional distillation conditions. In the preferred continuous process only a portion, say 20 to 50 weight percent of the total amount of meta-xylene is removed, leaving 50 to 80 weight percent for conversion in the isomerization step. After removal of the meta-xylene, the remaining residue is passed through line 8 to distillation stage II, comprising distillation column 9 where fractional distillation is continued. In this distillation stage, the remainder of the meta-xylene and about 10 to 30 weight percent of the ortho-xylene are distilled off and passed by line 10 to the isomerization stage 15. The residue or non-distilled portion from distillation II comprising about 60 to 90 weight percent of the ortho-xylene and the $C_9$ and higher boiling materials is then removed from column 9 by line 11 and passed to distillation stage III. In this distillation stage III, the mixture is distilled in column 12 with fractionation and ortho-xylene taken off through line 14. The residue, now comprising only the higher boiling $C_9^+$ materials, is removed from the system by line 13.

The ortho-xylene and meta-xylene mixture taken off through line 10 is sent to an isomerization stage 15 where at least a portion of the components present is converted to additional paraxylene. It is highly preferred that this isomerization step be conducted as a low temperature isomerization with toluene dilution wherein toluene diluent is added through line 16. This type of isomerization is called LTI herein. While LTI is the preferred manner of conducting the isomerization, it is to be understood that any of the well known isomerization techniques can be used in this step so long as ethylbenzene is not produced.

When using the low temperature isomerization stage with toluene dilution it may be carried out in any desired manner but is preferably conducted employing about 5 to 30% by weight, preferably 10 to 20% by weight of added toluene, based on the amount of material charged to the isomerization stage, as a diluent to increase selectivity in the isomerization of the meta-xylene and ortho-xylene and the formation of para-xylene. This isomerization reaction may be carried out over any desired catalyst but is preferably carried out in the presence of a crystalline aluminosilicate catalyst which has a pore size of greater than 5 angstrom units such as zeolites X, Y, mordenite, and ZSM-4. Because members of the family of zeolites designated as ZSM-4 possess extraordinary selectivity, such materials are especially preferred. These ZSM-4 catalysts are more fully described hereinafter.

The low temperature isomerization may be carried out at temperatures between about 250° F. and 1000° F. and at pressures ranging from ambient pressures or less up to about 2000 p.s.i.g. In general, the isomerization reaction is preferably carried out at temperatures ranging from about 350° F. to 650° F. Within these limits the conditions of temperature and pressure may vary considerably depending upon equilibrium considerations and reaction conditions. Quite obviously optimum conditions are those in which maximum yields of desired isomer products are obtained and hence considerations of temperature and pressure may vary within a range of conversion levels designed to provide the highest selectivity and maximum yield. However, in a preferred operation using the ZSM-4 catalyst, it has been found that controlled isomerizations can be effectively achieved at temperatures below about 600° F. and a liquid phase operation using sufficient pressure to maintain the material in a liquid phase. The liquid phase operation is especially advantageous since high levels of activity and selectivity can be maintained for an extended period of time.

The isomerization reaction can be carried out over a wide range of liquid hourly space velocities (LHSV) within the range of 0.05 to 40. Good selectivity is obtained within these limits.

As pointed out, in this isomerization stage there is formed additional para-xylene to be recovered in the process as well as other valuable components and some higher boiling materials. This mixture is then sent by line 17 to distillation stage IV comprising distillation column 18 where any toluene is removed by line 19 and recycled for use in the process in the isomerization stage. Any benzene present, either present originally in the mixture or formed in the isomerization stage, is distilled from the mixture by line 20. The resulting mother liquor, comprising orthoxylene, meta-xylene, para-xylene and C_9 and higher aromatics, is then passed through line 21 to a further chromatography or adsorption step separation II comprising adsorber 22 for the recovery of para-xylene through line 23. This chromatograph or adsorber may be operated as in the initial step utilizing the same type of catalyst, adsorber or chromatographic agent under such conditions as to recover substantially pure para-xylene through line 23. This is the para-xylene which was formed in the low temperature isomerization stage. Alternatively, this step may be conducted under any of the various conditions outlined above and thus may be the same or different from the first step. It is only necessary that the adsorbent be of such nature as to adsorb only the para-xylene from the mixture, which para-xylene may be subsequently desorbed as described.

After desorption of the para-xylene and removal thereof from the system, the remaining mixture is cycled through line 24 to line 5 and distillation stage I for re-use in the system and the recovery of additional materials.

As pointed out above, the process can also be operated so as to increase the yield of para-xylene obtained. Thus in this separate embodiment, a specific process is practiced which does not produce ortho-xylene. This is accomplished by eliminating or bypassing distillation stage III, rejecting heavy ends (C_9+) in distillation stage II, and recycling the ortho-xylene to extinction. Any meta-xylene above the desired production may also be recycled to extinction.

In a further specific embodiment, distillation stage I or column 6 are removed or by-passed so as not to produce meta-xylene, the meta-xylene being recycled to extinction. A distinguishing feature of this specific process is that para-xylene contamination of Separations I and II effluents is permissable without adverse affect. Thus, there may be para-xylene present in the feed stream in this aspect since meta-xylene is not co-produced.

In a third specific embodiment, neither meta- nor ortho-xylene is produced so distillation stages I and III are omitted with the meta- and ortho-xylene recycled to extinction, and the heavy ends (C_9+) being rejected in distillation stage II. The presence of para-xylene in the effluent of Separations I and II is also permissible in this embodiment since no meta-xylene is produced.

The use of two chromatographic or absorbent separations in this process provide definite advantages as no ethylbenzene is present in the feed sent to the second separation. Therefore separation of para-xylene from meta-xylene and ortho-xylene is required but this can be accomplished with less adsorbent and desorbent than in the first separation where three separate fractions are required, i.e., para-xylene in one fraction, ethylbenzene in one fraction and a mixture of meta-xylene and ortho-xylene in one fraction.

In addition, the cycle time in this process is reduced and the throughput is increased since only two fractions are required, i.e., the time of elution of a third fraction required in the first separation can be used for processing another feed charge in the second separation. If only one separation was used and the feed mixed, the separations would be essentially the same as the first separation in the two separation scheme.

It will thus be seen that the process provides an integral and continuous process for the recovery of the valuable components from the aromatic mixture as well as means for the conversion of less desirable materials to the more highly preferred para-xylene and the recovery thereof from the system. In this system the para-xylene recovery is high being on the order of about 97% of the para-xylene present. Thus, the process provides a method whereby the need for conventional ethylbenzene distillation in an isomerization loop and recycle of crystallization mother liquor is eliminated. Since the para-xylene and ethylbenzene have been substantially removed from the system, the meta-xylene and ortho-xylene contained in the composition can be easily separated by distillation as described.

The crystalline zeolites used in the low temperature isomerization and designated as "Zeolite ZSM-4" or simply "ZSM-4" are disclosed and claimed in copending U.S. application Ser. No. 722,149, filed Apr. 18, 1968, of the same assignee. They can be identified in terms of mole ratios of oxides as follows:

$$0.9 \pm 0.2 M_{2/n}O : W_2O_3 : 3-20 YO_2 : zH_2O$$

wherein M is a cation, $n$ is the valence of said cation, W is selected from the group consisting of aluminum and gallium, Y is selected from the group consisting of silicon and germanium, and z is from 0 to 20. In the synthesized form the zeolite has a formula, in terms of mole ratios of oxides as follows:

$$0.9 \pm 0.2 M_{2/n}O : Al_2O_3 : 3\text{--}20 SiO_2 : zH_2O$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2 [xR_2O + (1-x)M_{2/n}O]:$$
$$W_2O_3 : 3\text{--}20 YO_2 : 0\text{--}20 H_2O$$

where W and Y have the previously assigned significance, R is tetramethylammonium, M is an alkali metal cation and x is between 0.01 and 0.50.

The original cations can be replaced, at least in part, by ion exchange with another cation. Preferably, the other cation is selected from the group consisting of alkylammonium, e.g. tetramethylammonium, arylammonium, metals, ammonium, hydrogen, thermally treated products of ammonium and/or hydrogen, or combinations of any of these cations. Particularly, preferred cations include hydrogen, rare earth metals, aluminum, metals of groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700° F. In a preferred embodiment of ZSM-4, W is aluminum, Y is silicon and the silica/alumina mole ratio is at least 5 and ranges up to about 15.

Members of the family of ZSM-4 zeolites possess a definite distinguishing crystalline structure whose X-ray diffraction pattern has the following values:

TABLE 1

| Interplanar spacing $d(A)$: | Relative intensity |
|---|---|
| .1±.2 | v.s. |
| 7.94±.1 | m.w. |
| 6.90±.1 | m. |
| 5.97±.07 | s. |
| 5.50±.05 | m.w. |
| 5.27±.05 | m.w. |
| 4.71±.05 | m.w. |
| 4.39±.05 | w. |
| 3.96±.05 | w. |
| 3.80±.05 | s. |
| 3.71±.05 | m. |
| 3.63±.05 | m. |
| 3.52±.05 | s. |
| 3.44±.05 | m. |
| 3.16±.05 | s. |
| 3.09±.05 | m. |
| 3.04±.05 | m. |
| 2.98±.05 | m. |
| 2.92±.05 | s. |

These values were determined by standard techniques. The radiation was the K-alpha doublet of copper, and a Geiger Counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A., corresponding to the recorded lines, were calculated. In Table 1 the relative intensities are given in terms of the symbols s.=strong, m.=medium, m.s.=medium strong, m.w.=medium weak and v.s.=very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray powder diffraction patterns of several of these forms are set forth below. The ZSM-4 forms set forth below are all aluminosilicates.

TABLE 2

| NaTMAZSM-4 | | NaTMAZSM-4 | | HZSM-4 | | ZnNaTMAZSM-4 | |
|---|---|---|---|---|---|---|---|
| d(A.) | I/I₀ | d(A.) | I/I₀ | d(A.) | I/I₀ | d(A.) | I/I₀ |
| 17.5 | 2 | 17.6 | 5 | | | | |
| 16.0 | 17 | 16.1 | 20 | 15.8 | 12 | 16.1 | 6 |
| 9.18 | 100 | 9.19 | 100 | 9.12 | 100 | 9.21 | 79 |
| 7.96 | 21 | 7.96 | 20 | 7.88 | 49 | 7.97 | 40 |
| | | 7.34 | 3 | | | | |
| 6.94 | 12 | 6.93 | 30 | 6.85 | 24 | 6.92 | 36 |
| 6.01 | 34 | 6.01 | 33 | 5.95 | 62 | 6.01 | 60 |
| 5.53 | 4 | 5.53 | 7 | 5.47 | 10 | 5.53 | 6 |
| 5.29 | 8 | 5.29 | 7 | 5.25 | 10 | 5.29 | 15 |
| 4.72 | 30 | 4.72 | 31 | 4.69 | 19 | 4.73 | 51 |
| | | | | 4.54 | 7 | | |
| 4.41 | 4 | 4.39 | 4 | 4.37 | 23 | 4.40 | 9 |
| 4.12 | 5 | 4.19 | 1 | | | | |
| 3.97 | 13 | 3.95 | 11 | 3.94 | 20 | 3.97 | 18 |
| 3.82 | 67 | 3.81 | 69 | 3.78 | 52 | 3.82 | 100 |
| 3.74 | 11 | 3.72 | 28 | 3.69 | 14 | 3.72 | 36 |
| 3.64 | 31 | 3.63 | 26 | 3.61 | 13 | 3.64 | 24 |
| 3.54 | 30 | 3.53 | 54 | 3.50 | 28 | 3.53 | 72 |
| 3.46 | 7 | 3.45 | 14 | 3.42 | 12 | 3.45 | 15 |
| 3.28 | 4 | 3.28 | 5 | | | | |
| 3.17 | 73 | 3.16 | 48 | 3.15 | 43 | 3.17 | 60 |
| 3.10 | 12 | 3.10 | 23 | 3.07 | 14 | 3.10 | 27 |
| 3.05 | 25 | 3.04 | 21 | 3.03 | 20 | 3.05 | 27 |
| 2.99 | 14 | 2.99 | 13 | 2.97 | 10 | 3.00 | 18 |
| 2.93 | 43 | 2.92 | 48 | 2.91 | 29 | | |
| 2.83 | 4 | 2.83 | | 2.81 | 1 | | |
| 2.775 | 1 | | | 2.77 | 1 | | |
| 2.67 | 3 | 2.67 | 2 | | | 2.66 | 9 |
| 2.65 | 6 | 2.65 | 3 | 2.64 | 7 | 2.64 | 8 |
| 2.63 | 5 | 2.63 | 3 | 2.61 | 3 | 2.57 | 2 |
| 2.56 | 1 | 2.55 | 2 | 2.55 | 1 | 2.53 | 8 |
| 2.52 | 6 | 2.52 | 3 | 2.52 | 5 | 2.51 | 2 |
| 2.49 | 4 | 2.48 | 2 | 2.49 | 2 | 2.48 | 1 |
| 2.43 | 1 | 2.41 | 1 | 2.42 | 1 | 2.42 | 2 |
| 2.40 | 3 | 2.395 | 2 | 2.39 | 1 | 2.39 | 6 |
| 2.38 | 5 | 2.37 | 2 | 2.36 | 2 | 2.35 | 1 |
| 2.34 | 1 | 2.30 | 1 | | | 2.29 | 4 |
| 2.28 | 7 | 2.27 | 2 | 2.27 | 3 | 2.265 | 2 |
| 2.19 | 2 | | | 2.18 | 2 | 2.17 | 4 |
| 2.17 | 1 | | | 2.15 | 2 | 2.145 | 3 |
| 2.14 | 3 | 2.14 | 2 | 2.125 | 3 | 2.115 | 3 |
| 2.10 | 4 | 2.10 | 2 | 2.10 | 3 | 2.10 | 2 |
| 2.09 | 2 | 2.08 | 1 | 2.07 | 1 | 2.06 | 3 |
| 2.04 | 1 | 2.03 | 1 | 2.02 | 2 | 2.015 | 1 |
| 2.02 | 3 | 2.015 | 1 | 2.01 | 2 | 2.00 | 6 |
| 1.99 | 6 | 1.98 | 4 | 1.98 | 3 | 1.97 | 6 |

| RENaZSM-4 | | CaNaTMAZSM-4 | | MgNaTMAZSM-4 | |
|---|---|---|---|---|---|
| d(A.) | I/I₀ | d(A.) | I/I₀ | d(A.) | I/I₀ |
| | | 17.5 | 8 | | |
| | | 15.8 | 38 | 16.1 | 17 |
| 9.12 | 87 | 9.10 | 100 | 9.07 | 100 |
| 7.93 | 8 | 7.90 | 11 | 7.93 | 28 |
| 6.89 | 42 | 6.88 | 43 | 6.89 | 36 |
| 5.97 | 71 | 5.96 | 55 | 5.98 | 64 |
| 5.49 | 5 | 5.49 | 13 | 5.50 | 7 |
| 5.27 | 10 | 5.26 | 10 | 5.29 | 17 |
| 4.79 | 8 | 4.92 | 3 | | |
| 4.70 | 37 | 4.70 | 18 | 4.73 | 48 |
| | | 4.61 | 5 | | |
| 4.38 | 16 | 4.37 | 15 | 4.41 | 10 |
| | | 4.11 | 5 | | |
| 3.94 | 10 | 3.95 | 13 | 3.96 | 12 |
| 3.79 | 100 | 3.80 | 63 | 3.81 | 95 |
| 3.71 | 32 | 3.71 | 18 | 3.72 | 36 |
| 3.62 | 24 | 3.62 | 25 | 3.64 | 26 |
| 3.52 | 82 | 3.52 | 55 | 3.53 | 86 |
| 3.44 | 20 | 3.44 | 15 | 3.45 | 24 |
| | | | | 3.28 | 5 |
| 3.15 | 58 | 3.15 | 55 | 3.16 | 67 |
| 3.08 | 26 | 3.09 | 25 | 3.10 | 33 |
| 3.03 | 24 | 3.04 | 20 | 3.05 | 28 |
| 2.98 | 24 | 2.98 | 23 | 3.00 | 21 |
| 2.92 | 66 | 2.92 | 63 | 2.92 | 74 |
| 2.83 | 4 | 2.83 | 4 | 2.84 | 3 |
| 2.65 | 7 | 2.65 | 14 | 2.66 | 10 |
| 2.63 | 10 | 2.625 | 9 | 2.63 | 9 |
| | | 2.55 | 2 | 2.56 | 3 |
| 2.53 | 11 | 2.52 | 8 | 2.53 | 9 |
| 2.49 | 4 | 2.48 | 3 | 2.49 | 4 |
| 2.43 | 2 | 2.43 | 2 | 2.43 | 3 |
| | | 2.40 | 2 | 2.40 | 4 |
| 2.38 | 10 | 2.375 | 6 | 2.38 | 7 |
| 2.27 | 10 | 2.275 | 10 | 2.29 | 7 |
| | | | | 2.27 | 3 |
| 2.20 | 3 | 2.20 | 1 | 2.205 | 4 |
| | | 2.16 | 2 | 2.17 | 5 |
| | | 2.14 | 4 | 2.14 | 7 |
| 2.10 | 4 | 2.10 | 3 | 2.11 | 5 |
| | | 2.08 | 1 | 2.09 | 3 |
| | | 2.03 | 1 | 2.04 | 5 |
| | | 2.015 | 2 | 2.02 | 1 |
| 1.98 | 6 | 1.985 | 6 | 1.99 | 9 |

The zeolite may be employed alone or composited with another material such as a naturally occurring clay. Naturally occurring clays which can be composited with the ZSM-4 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcine at temperatures ranging from 230° F. to 1600° F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline zeolite ZSM-4 and inorganic oxide gel matrix vary widely with the zeolite content ranging from about 1 to about 90 percent by weight and more usually, particularly when the composite is prepared in the form of beads, in the range of about 2 to about 50 percent by weight of the composite.

As pointed out above, the separations I and II are carried out in a chromatographic manner utilizing an adsorbent which will adsorb only the para-xylene and ethylbenzene but not the other materials. The preferred materials to effect these separations are certain crystalline aluminosilicate zeolite molecular sieves which have the desired properties. Preferred zeolites are the ZSM-5 and ZSM-8 zeolites described below. More preferred are ZSM-5 and ZSM-8 zeolites which have been reacted with certain silanes as described below.

The temperature at which the separations are carried out is also important; thus, temperatures ranging from about 100° C. to about 250° C. should be used. It should be noted that a wider temperature range can be employed but because of the possibility of catalytic conversion in the zeolite-containing column and detrimental effects on the catalyst, 250° C. appears to be a suitable upper limit. A more preferred temperature range appears to be between about 100° to 200° C.

As indicated above, the zeolites preferably utilized in the separation are of a special type and are disclosed and claimed for use in a novel zeolite chromatographic process in copending application Ser. No. 882,692, filed Dec. 5, 1969, J. Cattanach of the same assignee. Generally, these zeolitic materials allow selective separations to be achieved depending on either the size, shape or polarity of the sorbate molecules. This class of novel crystalline aluminosilicates can generally be stated to have intermediate shape-selective sorption properties. The unique nature of this novel class of zeolites is characterized by the presence of uniform pore openings which are apparently elliptical rather than circular in nature. The effective pore openings of this unique class of zeolites have both a major and minor axis, and it is for this reason that the unusual and novel molecular sieving effects are achieved. The unique type of molecular sieving produced has generally been referred to as a "keyhole" molecular sieving action. From their dynamic molecular sieving properties it would appear that the major and minor axis of the elliptical pore in this family of zeolites have effective sizes of about 7.0±0.7 A. and 5.0±0.5 A., respectively.

This general family of zeolites are described as ZSM-5 type compositions. In general, they have the characteristic X-ray diffraction pattern set forth in Table 3 hereinbelow.

ZSM-5 compositions can also be identified, in terms of mole ratios of oxides, as follows:

$$0.9\pm0.2 M_{2/n}O : W_2O_3 : 5\text{--}100 YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a more preferred synthesized form, the zeolite has a formula, in terms of mole ratios of oxides, as follows:

$$0.9\pm0.2 \; M_{2/n}O : Al_2O_3 : 5\text{--}100 \; SiO_2 : zH_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the significant lines set forth in Table 3 following:

TABLE 3

| Interplanar spacing $d$(A): | Relative intensity |
|---|---|
| 11.1±0.2 | S. |
| 10.0±0.2 | S. |
| 7.4±0.15 | W. |
| 7.1±0.15 | W. |
| 6.3±0.1 | W. |
| 6.04±0.1 | W. |
| 5.97±0.1 | W. |
| 5.56±0.1 | W. |
| 5.01±0.1 | W. |
| 4.60±0.08 | W. |
| 4.25±0.08 | W. |
| 3.85±0.07 | V.S. |
| 3.71±0.05 | S. |
| 3.64±0.05 | M. |
| 3.04±0.03 | W. |
| 2.99±0.02 | W. |
| 2.94±0.02 | W. |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I$, where I is the intensity of the strongest line or peak, and $d$ (obs.), the interplanar spacing in A, corresponding to the recorded lines, were calculated. In Table 1 the relative intensities are given in terms of the symbols S.=strong, M.=medium, M.S.=medium strong, M.W.=medium weak and V.S.=very strong. It should be understood that this X-ray diffraction pattern is characteristic of all the species of ZSM-5 compositions. Ion exchange of the sodium ion with other cation reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM-5 have been prepared. X-ray powder diffraction patterns of several of these forms are set forth below in Table 4. The ZSM-5 forms set forth below are all aluminosilicates.

TABLE 4

X-ray diffraction, ZSM-5 powder in cation exchanged forms, d spacings observed

| As made | HCl | NaCl | CaCl₂ | RECl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 | 9.02 |  | 8.99 |
| 8.06 |  |  |  |  |  |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 |  |  | 3.17 | 3.18 |  |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |
| 2.80 |  |  |  |  |  |
| 2.78 |  |  | 2.78 |  | 2.78 |
| 2.73 | 2.74 | 2.74 | 2.73 | 2.74 | 2.74 |
| 2.67 |  |  | 2.68 |  |  |
| 2.66 |  |  | 2.65 |  |  |
| 2.60 | 2.61 | 2.61 | 2.61 | 2.61 | 2.61 |
|  | 2.59 |  | 2.59 |  |  |
| 2.57 |  | 2.57 | 2.56 |  | 2.57 |
| 2.50 | 2.52 | 2.52 | 2.52 | 2.52 |  |
| 2.49 | 2.49 | 2.49 | 2.49 | 2.49 | 2.49 |
|  |  |  | 2.45 |  |  |
| 2.41 | 2.42 | 2.42 | 2.42 | 2.42 |  |
| 2.39 | 2.40 | 2.40 | 2.39 | 2.40 | 2.40 |
|  |  |  | 2.38 | 2.35 | 2.38 |
|  | 2.33 |  | 2.33 | 2.32 | 2.33 |
|  | 2.30 |  |  |  |  |
|  | 2.24 | 2.23 | 2.23 |  |  |
|  | 2.20 | 2.21 | 2.20 | 2.20 |  |
|  | 2.18 | 2.18 |  |  |  |
|  |  | 2.17 | 2.17 |  |  |
|  | 2.13 |  | 2.13 |  |  |
|  | 2.11 | 2.11 |  | 2.11 |  |
|  |  |  | 2.10 | 2.10 |  |
|  | 2.08 | 2.08 |  | 2.08 | 2.08 |
|  |  | 2.07 | 2.07 |  |  |
|  |  |  | 2.04 |  |  |
| 2.01 | 2.01 | 2.01 | 2.01 | 2.01 | 2.01 |
| 1.99 | 2.00 | 1.99 | 1.99 | 1.99 | 1.99 |
|  |  |  | 1.97 | 1.96 |  |
| 1.95 | 1.95 | 1.95 | 1.95 | 1.95 |  |
|  |  |  |  | 1.94 |  |
|  | 1.92 | 1.92 | 1.92 | 1.92 | 1.92 |
| 1.91 |  |  |  | 1.91 |  |
|  |  |  |  | 1.88 |  |
| 1.87 | 1.87 | 1.87 | 1.87 | 1.87 | 1.87 |
|  | 1.86 |  |  |  |  |
| 1.84 | 1.84 |  |  | 1.84 | 1.84 |
| 1.83 | 1.83 | 1.83 | 1.83 | 1.83 |  |
| 1.82 |  | 1.81 |  | 1.82 |  |
| 1.77 | 1.77 | 1.79 | 1.78 |  | 1.77 |
| 1.76 | 1.76 | 1.76 | 1.76 | 1.76 | 1.76 |
|  |  | 1.75 |  |  | 1.75 |
|  | 1.74 | 1.74 | 1.73 |  |  |
| 1.71 | 1.72 | 1.72 | 1.71 |  | 1.70 |
| 1.67 | 1.67 | 1.67 |  | 1.67 | 1.67 |
| 1.66 | 1.66 |  | 1.66 | 1.66 | 1.66 |
|  |  | 1.65 | 1.65 |  |  |
|  |  | 1.64 | 1.64 |  |  |
|  | 1.63 | 1.63 | 1.63 | 1.63 | 1.62 |
|  | 1.61 | 1.61 | 1.61 |  | 1.61 |
| 1.58 |  |  |  |  |  |
|  | 1.57 | 1.57 |  | 1.57 | 1.57 |
|  |  | 1.56 | 1.56 | 1.56 |  |

Zeolite ZSM₄5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 5

|  | Broad | Preferred | Particularly preferred |
|---|---|---|---|
| OH/SiO₂ | 0.07-1.0 | 0.1-0.8 | 0.2-0.75 |
| R₄N+/(R₄N+ + Na+) | 0.2-0.95 | 0.3-0.9 | 0.4-0.9 |
| H₂O/OH⁻ | 10-300 | 10-300 | 10-300 |
| YO₂/W₂O₃ | 5-100 | 10-60 | 10-40 | wherein R is propyl, W is aluminum or gallium and Y is silicon or germanium, maintaining the mixture until crystals of the zeolite are formed. Thereafter, the crystals are separated from the liquid and recovered. Typical reaction conditions consist of heating the foregoing reaction mixture to a temperature of from about 90° C. to 200° C. for a period of time of from about six hours to 60 days. A more preferred temperature range is from about 100 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F. for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. The family of ZSM-5 zeolites is disclosed and claimed in copending application Ser. No. 865,472, filed Oct. 10, 1969, of applicants' assignee.

Another operable zeolite falling within the above class and useful in the process of the invention is zeolite ZSM-8 which is described and claimed in Ser. No. 865,418, filed Oct. 10, 1969, of applicants' assignee.

The ZSM-8 family can also be identified, in terms of mole ratios of oxides, as follows:

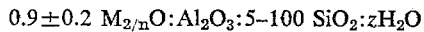

$$0.9 \pm 0.2\ M_{2/n}O : Al_2O_3 : 5\text{-}100\ SiO_2 : zH_2O$$

wherein M is at least one cation, n is the valence thereof and z is from 0 to 40. In a preferred synthesized form, the zeolite has a formula, in terms of mole ratios of oxides, as follows:

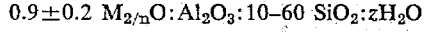

$$0.9 \pm 0.2\ M_{2/n}O : Al_2O_3 : 10\text{-}60\ SiO_2 : zH_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 6

| dA. | I/I₀ | dA. | I/I₀ | dA. | I/I₀ | dA. | I/I₀ |
|---|---|---|---|---|---|---|---|
| 11.1 | 46 | 4.35 | 7 | 3.04 | 10 | 2.32 | 1 |
| 10.0 | 42 | 4.25 | 18 | 2.99 | 6 | 2.28 | 1 |
| 9.7 | 10 | 4.07 | 20 | 2.97 | 4 | 2.23 | 1 |
| 9.0 | 6 | 4.00 | 10 | 2.94 | 3 | 2.20 | 1 |
| 7.42 | 10 | 3.85 | 100 | 2.86 | 2 | 2.17 | 1 |
| 7.06 | 7 | 3.82 | 57 | 2.78 | 1 | 2.12 | 1 |
| 6.69 | 5 | 3.75 | 25 | 2.73 | 4 | 2.11 | 1 |
| 6.35 | 12 | 3.71 | 30 | 2.68 | 1 | 2.08 | 1 |
| 6.04 | 6 | 3.64 | 26 | 2.61 | 3 | 2.06 | 1 |
| 5.97 | 12 | 3.59 | 2 | 2.57 | 1 | 2.01 | 6 |
| 5.69 | 9 | 3.47 | 6 | 2.55 | 1 | 1.99 | 6 |
| 5.56 | 13 | 3.43 | 9 | 2.51 | 1 | 1.95 | 2 |
| 5.36 | 3 | 3.39 | 5 | 2.49 | 6 | 1.91 | 2 |
| 5.12 | 4 | 3.34 | 18 | 2.45 | 1 | 1.87 | 3 |
| 5.01 | 7 | 3.31 | 8 | 2.47 | 2 | 1.84 | 1 |
| 4.60 | 7 | 3.24 | 4 | 2.39 | 3 | 1.82 | 2 |
| 4.45 | 3 | 3.13 | 3 | 2.35 | 1 | | |

Zeolite ZSM-8 can be suitably prepared by reacting a solution containing either tetraethylammonium hydroxide or tetraethylammonium bromide together with sodium oxide, aluminum oxide, and an oxide of silica and water. The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range:

$SiO_2/Al_2O_3$—from about 10 to about 200
$Na_2O$/tetraethylammonium hydroxide—from about 0.05 to 0.20
Tetraethylammonium hydroxide/$SiO_2$—from about 0.08 to 1.0
$H_2O$/tetraethylammonium hydroxide—from about 80 to about 200

Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. 3,140,249; U.S. 3,140,251; and U.S. 3,140,253.

Following contact with the salt solution of the desired replacing cation, the zeolites are then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more.

Prior to use, the zeolites should be dehydrated at least partially. This can be done by heating to a temperature in the range of 200 to 600° C. in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

In practicing the process, it may be desired to incorporate the zeolite with another material resistant to the temperatures and other conditions employed in the separation processes. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides.

Naturally occurring clays which can be composited with the zeolites include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-5 type zeolites can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-5 and inorganic oxide gel matrix vary widely with the crystalline aluminosilicate content ranging from about 1 to about 99 percent by weight and more usually, particularly when the composite is prepared in the form of beads in the range of about 40 to about 90 percent by weight of the composite.

Another embodiment of this invention resides in subjecting the zeolite ZSM-5 type to a mild steam treatment carried out at elevated temperatures of 800° F. to 1500° F. and preferably at temperatures of about 1000° F. to 1400° F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

Even more highly preferred adsorbents are ZSM-5 and ZSM-8 zeolites which have been treated or contacted with a silane compound as superior results are achieved using these products as adsorbents. The organic substituted silanes deemed useful in the process of the present invention are those of the following general formula:

wherein, in the above formula, R is an organic radical as described hereinafter and each $R_1$ is also an organic radical such as those defined below for the group R, a hydrogen atom or a halogen atom such as chlorine or bromine. Organic radicals which may be R or $R_1$ include alkyl of 1 and more preferably up to about 40 carbon atoms, alkyl or aryl carboxylic acid acyl wherein the organic portion of said acyl group contains about 1 to 30 carbon atoms and said aryl group contains about 6 to 24 carbon atoms, aryl groups of about 6 to 24 carbons, which may also be further substituted, alkaryl and aralkyl groups containing about 7 up to about 30 carbon atoms. Highly preferred compounds falling within the above structure are those wherein R is alkyl of about 12 to 24 carbon atoms, i.e., the long chained alkyl groups, and each $R_1$ is hydrogen or chlorine. Highly preferred silanes are octadecyltrichlorosilane and dodecyltrichlorosilane. Organic silanes of the type useful in the process of the present invention are known in the art and may be prepared by known methods. For example, the tetrachloro substituted silane, $SiCl_4$, may be prepared by the reaction of chlorine and silica and the resulting product may then be reacted with the desired number of moles of a metal salt of the organic compound containing the radical for R or $R_1$ desired, by heating. Other silanes employed in the process of the present invention may be prepared by similar procedures, all of which are well known in the art.

The desired silane is then contacted with a zeolite of the type described hereinbefore, one requirement of the zeolite being that it have an available hydrogen for reaction. The silane should be selected so that steric hindrance problems are avoided. Thus in the above formula, R and only two $R_1$ should be organic radicals which means that at least one $R_1$ should be hydrogen.

The selected silane and the crystalline aluminosilicate zeolite are contacted in the preferred procedure at an elevated temperature. Preferably, the silane and zeolite are contacted on a weight basis of about 1:5 to 5:1, preferably about 1:2 to 1:1, respectively. It is also preferable that a binder for the zeolite be employed such as, for example, bentonite. For good contact between the reactants, it is also preferable to employ a reaction medium. Satisfactory media include the ethers, aliphatic hydrocarbons and halo-substituted aliphatic hydrocarbons of 5 to about 8 carbon atoms (e.g., n-heptane), the aromatic, halo-substituted aromatic hydrocarbons and nitrogen containing compounds such as heterocyclics. A particularly preferred media is pyridine.

As indicated, an elevated temperature should also be employed for the reaction, preferably a temperature of about 75 to 200° C. A convenient procedure is to charge the reactants to the medium and heat at the reflux point of the system for about 1 to 10 hours. The mixture is then contacted with a volatile solvent such as chloroform or n-pentane, filtered and dried in an oven at a temperature of about 75 to 125° C.

The resulting modified zeolite may be described as a crystalline aluminosilicate having the organic substituted silane chemically bonded thereto and the resulting zeolite is thermally stable.

The carriers which may be employed are discussed hereinabove. Also, the process may be carried out in either a batch or continuous operation. The sorbed material can be subsequently recovered by conventional desorbing techniques such as thermal stripping, stripping with an inert gas, e.g., nitrogen, helium, etc. or evacuation or elutriation with a suitable polar or non-polar stripping agent, e.g., water, n-hexane, etc.

The following examples will illustrate the best mode contemplated for carrying out the present invention.

EXAMPLES 1–4

Typical preparations of ZSM–5 type zeolites are shown in these examples. Examples 1–3 show the preparation of the hydrogen form ZSM–5 and they involve the use of tetrapropyl-ammonium hydroxide (TPAOH) or bromide (TPABr). Example 4 shows a typical preparation of the hydrogen form ZSM–8 using tetraethyl ammonium hydroxide (TEAOH). Reaction conditions and results are shown in Table 7.

TABLE 7

| | 1 | 2 | 3 | 4 |
|---|---|---|---|---|
| Reaction composition | 30 g. $NaAlO_2$; 720 g. Ludox; 1,025 g. of 2.2N TPAOH | 281 g. Sorbead fines; 3.3 lb. TPABr solution | 0.56 lb. $NaAlO_2$; 44.7 lb. Q-Brand; 5.6 lb. TPABr; 16.7 lb. NaCl; 4.5 lb. $H_2SO_4$; 132.0 lb. $H_2O$ | 13 g. $NaAlO_2$; 300 g. 40% TEAOH; 300 g. $H_2O$; 1,000 g. Ludox |
| Reaction temperature (° C.) | 150 | 100 | 100 | 193 |
| Reaction time (hr.) | 168 | 168 | 327 | 144 |
| Washed dried at 230° F., calcined 16 hrs. at 1,000° F. | | | | |
| Base exchange ($NH_4Cl$ solution): | | | | |
| Concentration (wt. percent) | 25 | 5 | 25 | 25 |
| Temperature (° C.) | 90 | 25 | 90 | 90 |
| Contacts | ×3 | ×4 | ×3 | ×3 |
| Pelleted: | | | | |
| Calcined: | | | | |
| Hour | 16 | 10 | 16 | 16 |
| ° F | 1,000 | 1,000 | 1,000 | 1,000 |
| Steamed: | | | | |
| Hour | 14 | 24 | 14 | 14 |
| ° F | 1,290 | 1,200 | 1,290 | 1,290 |
| P.s.i.a | 15 | 30 | 15 | 15 |
| Chemical composition (g./100 g.): | | | | |
| Na | 0.08 | 0.23 | 0.02 | <.5 |
| $Al_2O_3$ | 4.7 | 2.2 | 3.0 | 3.0 |
| $SiO_2$ | 96.9 | 95.3 | 94.8 | 95.9 |
| X-ray type | ZSM-5 | ZSM-5 | ZSM-5 | ZSM-8 |

EXAMPLE 5

In this example 30 parts of a ZSM–5 crystalline aluminosilicate zeolite of the type prepared in Examples 1–3 comprising 80 parts ZSM–5 and 20 parts bentonite binder, were refluxed with octadecyltrichlorosilane in a weight ratio of 1:1 in 200 cc. normal-heptane solvent for a period of four hours. Thereafter the resulting solid product was recovered by decantation, the solid washed first with chloroform, then with normal-pentane and then dried at a temperature of 125° C. for four hours.

EXAMPLE 6

The aromatic mixture employed as the feedstock in this example was 100 grams of a mixture containing 12 weight percent ethylbenzene, 25 weight percent paraxylene, 45 weight percent meta-xylene, 15 weight percent ortho-xylene and 3 weight percent of C$_9$ and higher aromatic paraffins. This mixture was initially heated to 350° F. and then passed through a vessel containing ZSM-5 zeolite as the adsorbent. The adsorbent was the type perpared in Examples 1-3. Thereafter a stream of steam was passed over the mixture at 350° F. which served to desorb first 23 grams of para-xylene followed by 10.5 grams of ethylbenzene.

After removal of the para-xylene and ethylbenzene by the adsorption step, a mixture containing meta-xylene, ortho-xylene and the remaining components of the mixture was then passed to a distillation column where, by fractional distillation, there was distilled off 35 grams of meta-xylene. The residue was then passed to a second distillation column where 5 grams of ortho-xylene and 9 grams of meta-xylene were distilled off and passed to a low temperature isomerization unit. The distillation residue was then passed to a third distillation column where 9 grams of ortho-xylene were distilled off leaving a tarry residue which was discarded.

The mixture of 5 grams ortho-xylene and 9 grams meta-xylene was then passed to the low temperature isomerization stage in which there was contained ZSM-4 zeolite as a catalyst. There was additionally added to the isomerization vessel about 20% by weight of toluene. This vessel was then maintained under temperature conditions of 500° F. with catalyst contact being about 2 LHSV. After isomerization, the mixture was then removed from the isomerization stage and sent to a distillation column in which the toluene diluent added in the isomerization stage was removed by distillation and recycled to the isomerization step for further use. In this distillation column there was also removed any benzene present. The resulting mixture was removed from the distillation column and sent to a second separation or adsorption step operated as in the initial step from which there was recovered an additional 3.0 grams of para-xylene. The remaining mixture, after the removal of para-xylene, was then recycled to the first distillation column.

It will thus be seen from the above example that the process of the present invention provides means whereby substantially 100% of the components contained in the aromatic mixture may be recovered therefrom, and additionally, the isomerization step in this unique combination maximizes para-xylene recovery.

EXAMPLE 7

This example illustrates the process when practiced without meta-xylene recovery. The apparatus was as described in Example 6 except that the first distillation column was by-passed and the unadsorbed materials sent directly to the second distillation column. The feed and first separation step were as in Example 6 except that the adsorbent was as prepared in Example 5.

After removal of the para-xylene and ethylbenzene in the adsorption step, the mixture containing meta-xylene, ortho-xylene and the remaining components was then passed directly to the second distillation column where, by fractional distillation, 9 grams of ortho-xylene and 44 grams of meta-xylene were distilled off. The distillation residue was then passed to the third distillation column where 5 grams of ortho-xylene were distilled off leaving a small tarry residue which was discarded.

The mixture of ortho-xylene and meta-xylene was then passed to the low temperature isomerization stage in which there was contained ZSM-4 zeolite as a catalyst. About 20 weight percent of toluene was additionally added to the isomerization vessel. This vessel was then maintained under temperature conditions of 500° F. with catalyst contact being about 2 LHSV. After isomerization, the mixture was then removed from the isomerization stage and sent to a distillation column in which the toluene diluent added in the isomerization stage was removed by distillation and recycled to the isomerization step for further use. In this distillation column there was also removed any benzene present. The resulting mixture was removed from the distillation column and sent to a second separation or adsorption step operated as in the initial step from which there was recovered an additional 12.0 grams of para-xylene. The remaining mixture, was then recycled to the first distillation column.

EXAMPLE 8

This example illustrates the process when practiced without ortho-xylene recovery. The apparatus was as described in Example 6 except that the third distillation column was by-passed. The feed and first separation step were conducted as in Example 6.

After removal of the para-xylene and ethylbenzene in the adsorption step, the mixture containing meta-xylene, ortho-xylene and the remaining components was then passed to a distillation column where, by fractional distillation, there was distilled off 31 grams of meta-xylene. The residue was then passed to a second distillation column where 13 grams of ortho-xylene and 12 grams of meta-xylene were distilled off. The tarry distillation residue was removed and discarded.

The mixture of ortho-xylene and meta-xylene was then passed to the low temperature isomerization stage in which there was contained ZSM-4 zeolite as a catalyst. There was additionally added to the isomerization vessel about 20% by weight of toluene. This vessel was then maintained under temperature conditions of 500° F. with catalyst contact being about 2 LHSV. After isomerization, the mixture was then removed from the isomerization stage and sent to a distillation column in which the toluene diluent added in the isomerization stage was removed by distillation and recycled to the isomerization step for further use. In this distillation column there was also removed any benzene present. The resulting mixture was removed from the distillation column and sent to a second separation or adsorption step operated as in the initial step from which there was recovered an additional 5.0 grams of para-xylene. The remaining mixture, after the removal of para-xylene, was then recycled to the first distillation column.

The invention has been described herein with reference to certain preferred embodiments. However, as obvious variations thereon will become apparent to those skilled in the art the invention is not to be considered as limited thereto.

What is claimed is:

1. A process for the separation and recovery of the components contained in an aromatic mixture, said components comprising para-xylene, ethylbenzene, meta-xylene and ortho-xylene, which process comprises the steps of:
   (a) contacting said aromatic mixture in a first adsorption zone with a crystalline alumino silicate selected from the group consisting of ZSM-5 and ZSM-8, whereby para-xylene and ethylbenzene are substantially selectively adsorbed and a mixture of meta-xylene and ortho-xylene are substantially not adsorbed;
   (b) desorbing said para-xylene and ethylbenzene;
   (c) removing said mixture of meta-xylene and ortho-xylene to a first distillation zone;
   (d) distilling at least a portion of said meta-xylene from the mixture to provide a first distillation residue;
   (e) removing said first distillation residue to a second distillation zone;
   (f) distilling the remaining meta-xylene and at least a portion of the ortho-xylene to provide a second distillation residue;
   (g) removing said second distillation residue to a third distillation zone and distilling to recover the remainder of the ortho-xylene;

(h) passing the meta-xylene and ortho-xylene from said second distillation zone to an isomerization zone and isomerizing to produce additional para-xylene;

(i) removing an isomerized product mixture, distilling off any volatile components, and passing the resulting mixture to a second adsorption zone and contacting with a crystalline alumino silicate selected from the group consisting of ZSM–5 and ZSM–8, whereby para-xylene is substantially selectively adsorbed and the other components are substantially selectively not adsorbed;

(j) desorbing and recovering the para-xylene; and (k) recycling the unadsorbed components to said first distillation zone.

2. A process according to claim 1 wherein said starting aromatic mixture contains about 15–40 weight percent of para-xylene, about 0–15 weight percent ethylbenzene, about 0–25 weight percent ortho-xylene and about 40–60 weight percent meta-xylene.

3. A process according to claim 2 wherein said adsorption stages are conducted in the presence of the adsorber at a temperature of about 50° to 500° F.

4. A process according to claim 3 wherein the isomerization step is a low temperature isomerization conducted by adding about 5 to 30% by weight of toluene to the mixture at a temperature of about 250° to 1000° F.

5. A process according to claim 4 wherein the isomerization is conducted over a liquid hourly space velocity of 0.05 to 40 in the presence of a ZSM–4 zeolite catalyst.

6. A process according to claim 5 wherein the adsorption steps are conducted in the presence of ZSM–5 zeolite at a temperature of about 50–500° F. and the isomerization step is conducted at a temperature of about 350–600° F., a space velocity of 0.25 to 10 and in the presence of a ZSM–4 zeolite.

7. A process for the separation and recovery of the components contained in an aromatic mixture, said components comprising para-xylene, ethylbenzene, meta-xylene and ortho-xylene, which process comprises the steps of:

(a) contacting said aromatic mixture in a first adsorption zone with a crystalline alumino silicate selected from the group consisting of ZSM–5 and ZSM–8, whereby para-xylene and ethylbenzene are substantially selectively adsorbed and a mixture of meta-xylene and ortho-xylene are substantially not adsorbed;

(b) desorbing said para-xylene and ethylbenzene;

(c) removing said mixture of meta-xylene and ortho-xylene to a first distillation zone;

(d) distilling the meta-xylene and at least a portion of the ortho-xylene to provide a first distillation residue;

(e) removing said first distillation residue to a second distillation zone and distilling to recover the remainder of the ortho-xylene;

(f) passing the meta-xylene and ortho-xylene from said first distillation zone to an isomerization zone and isomerizing to produce additional para-xylene;

(g) removing as isomerized product mixture, distilling off any volatile components, and passing the resulting mixture to a second adsorption zone and contacting with a crystalline alumino silicate selected from the group consisting of ZSM–5 and ZSM–8, whereby para-xylene is substantially selectively adsorbed and the other components are substantially selectively not adsorbed;

(h) desorbing and recovering the para-xylene; and (i) recycling the unadsorbed components to said first distillation zone.

8. A process according to claim 7 wherein said starting aromatic mixture contains about 15–40 weight percent of para-xylene, about 0–15 weight percent ethylbenzene, about 0–25 weight percent ortho-xylene and about 40–60 weight percent meta-xylene.

9. A process according to claim 8 wherein said adsorption stages are conducted in the presence of the adsorber at a temperature of about 50° to 500° F.

10. A process according to claim 9 wherein the isomerization step is a low temperature isomerization conducted by adding about 5 to 30% by weight of toluene to the mixture at a temperature of about 250° to 1000° F.

11. A process according to claim 10 wherein the isomerization is conducted over a liquid hourly space velocity of 0.05 to 40 in the presence of a ZSM–4 zeolite catalyst.

12. A process according to claim 11 wherein the adsorption steps are conducted in the presence of ZSM–5 zeolite at a temperature of about 50–500° F. and the isomerization step is conducted at a temperature of about 350–600° F., a space velocity of 0.25 to 10 and in the presence of a ZSM–4 zeolite.

13. A process for the separation and recovery of the components contained in an aromatic mixture, said components comprising para-xylene, ethylbenzene, meta-xylene and ortho-xylene, which process comprises the steps of:

(a) contacting said aromatic mixture in a first adsorption zone with a crystalline alumino silicate selected from the group consisting of ZSM–5 and ZSM–8, whereby para-xylene and ethylbenzene are substantially selectively adsorbed and a mixture of meta-xylene and ortho-xylene are substantially not adsorbed;

(b) desorbing said para-xylene and ethylbenzene;

(c) removing said mixture of meta-xylene and ortho-xylene to a first distillation zone;

(d) distilling at least a portion of said meta-xylene from the mixture to provide a first distillation residue;

(e) removing said first distillation residue to a second distillation zone;

(f) distilling the remaining meta-xylene and at least a portion of the ortho-xylene to provide a second distillation residue;

(g) removing said second distillation residue from said second distillation zone to an isomerization zone and isomerizing to produce additional para-xylene;

(h) removing an isomerized product, distilling off any volatile components, and passing the resulting mixture to a second adsorption zone and contacting with a crystalline alumino silicate selected from the group consisting of ZSM–5 and ZSM–8, whereby para-xylene is substantially selectively adsorbed and the other components are substantially selectively not adsorbed;

(i) desorbing and recovering the para-xylene; and (j) recycling the unadsorbed components to said first distillation zone.

14. A process according to claim 13 wherein said starting aromatic mixture contains about 15–40 weight percent of para-xylene, about 0–15 weight percent ethylbenzene, about 0–25 weight percent ortho-xylene and about 40–60 weight percent meta-xylene.

15. A process according to claim 14 wherein said adsorption stages are conducted in the presence of the adsorber at a temperature of about 50° to 500° F.

16. A process according to claim 15 wherein the isomerization step is a low temperature isomerization conducted by adding about 5 to 30% by weight of toluene to the mixture at a temperature of about 250° to 1000° F.

17. A process according to claim 16 wherein the isomerization is conducted over a liquid hourly space velocity of 0.05 to 40 in the presence of ZSM–4 zeolite catalyst.

18. A process according to claim 17 wherein the adsorption steps are conducted in the presence of ZSM–5 zeolite at a temperature of about 50–500° F. and the isomerization step is conducted at a temperature of about 350–600° F., a space velocity of 0.25 to 10 and in the presence of a ZSM–4 zeolite.

19. A process for the separation and recovery of the components contained in an aromatic mixture, said components comprising para-xylene, ethylbenzene, meta-xylene and ortho-xylene, which process comprises the steps of:
  (a) contacting said aromatic mixture in a first adsorption zone with a crystalline alumino silicate selected from the group consisting of ZSM-5 and ZSM-8, whereby para-xylene and ethylbenzene are substantially selectively adsorbed and a mixture of meta-xylene and ortho-xylene are substantially not adsorbed;
  (b) desorbing said para-xylene and ethylbenzene;
  (c) removing said mixture of meta-xylene and ortho-xylene to a distillation zone and distilling to separate the meta-xylene and ortho-xylene from the heavy ends;
  (d) passing the meta-xylene and ortho-xylene from the distillation to an isomerization zone and isomerizing to produce additional para-xylene;
  (e) removing an isomerized product mixture, distilling off any volatile components, and passing the resulting mixture to a second adsorption zone and contacting with a crystalline alumino silicate selected from the group consisting of ZSM-5 and ZSM-8, whereby para-xylene is substantially selectively adsorbed and the other components are substantially selectively not adsorbed;
  (f) desorbing and recovering the para-xylene; and
  (g) recycling the unadsorbed components to said distillation zone.

20. A process according to claim 19 wherein said starting aromatic mixture contains about 15–40 weight percent of para-xylene, about 0–15 weight percent ethylbenzene, about 0–25 weight percent ortho-xylene and about 40–60 weight percent meta-xylene.

21. A process according to claim 20 wherein the isomerization step is a low temperature isomerization conducted by adding about 5 to 30% by weight of toluene to the mixture at a temperature of about 250° to 1000° F.

22. A process according to claim 21 wherein the isomerization is conducted over a liquid hourly space velocity of 0.05 to 40 in the presence of a ZSM-4 zeolite catalyst.

23. A process according to claim 22 wherein the adsorption steps are conducted in the presence of ZSM-5 zeolite at a temperature of about 50–500° F. and the isomerization step is conducted at a temperature of about 350–600° F., a space velocity of 0.25 to 10 and in the presence of a ZSM-4 zeolite.

References Cited
UNITED STATES PATENTS

| | | | |
|---|---|---|---|
| 2,988,575 | 6/1961 | Hays et al. | 260—668 A |
| 3,624,172 | 11/1971 | Adams | 260—674 A |
| 3,636,121 | 1/1972 | Stine et al. | 260—674 SA |
| 3,636,180 | 1/1972 | Broughton | 260—668 A |
| 3,578,723 | 5/1971 | Bowes et al. | 260—668 A |

CURTIS R. DAVIS, Primary Examiner

U.S. Cl. X.R.
260—674 A, 674 SA

PO-1050
(5/69)

UNITED STATES PATENT OFFICE
CERTIFICATE OF CORRECTION

Patent No. 3,770,841                Dated November 6, 1973

Inventor(s) CLYDE C. MEYERS, JR.

It is certified that error appears in the above-identified patent and that said Letters Patent are hereby corrected as shown below:

| | |
|---|---|
| Column 1, line 71, | "is valuable" should be --is a valuable--. |
| Column 3, line 75, | "ethyl-benzene" should be --ethylbenzene--. |
| Column 6, line 33, | "absorbent" should be --adsorbent--. |
| Column 7, line 42, | ".1$\pm$.2" should be --9.1$\pm$.2--. |
| Column 11, line 72, | "ZSM$_4$5" should be --ZSM-5 --. |
| Column 15, line 74, | "factory media" should be --factory reaction media--. |

Signed and sealed this 9th day of April 1974.

(SEAL)
Attest:

EDWARD M. FLETCHER, JR.
Attesting Officer

C. MARSHALL DANN
Commissioner of Patents